United States Patent
Ban et al.

(10) Patent No.: US 8,879,673 B2
(45) Date of Patent: Nov. 4, 2014

(54) METHOD FOR COARSE FREQUENCY SYNCHRONIZATION IN OFDM RECEIVER

(71) Applicant: FCI Inc., Seongnam (KR)

(72) Inventors: Jae-Jun Ban, Seongnam (KR); Byeongmoo Moon, Seongnam (KR)

(73) Assignee: FCI Inc., Seongnam (KR)

( * ) Notice: Subject to any disclaimer, the term of this patent is extended or adjusted under 35 U.S.C. 154(b) by 0 days.

(21) Appl. No.: 13/786,054

(22) Filed: Mar. 5, 2013

(65) Prior Publication Data

US 2013/0230129 A1    Sep. 5, 2013

(30) Foreign Application Priority Data

Mar. 5, 2012    (KR) .................. 10-2012-0022222

(51) Int. Cl.
*H04L 27/06*    (2006.01)
*H04L 27/26*    (2006.01)
*H03D 1/00*    (2006.01)

(52) U.S. Cl.
CPC ................................. *H04L 27/2659* (2013.01)
USPC ............ 375/343; 375/260; 375/316; 375/324

(58) Field of Classification Search
USPC .................................. 375/260, 316, 343, 324
See application file for complete search history.

(56) References Cited

U.S. PATENT DOCUMENTS

| | | | |
|---|---|---|---|
| 6,628,606 B1 * | 9/2003 | Hong et al. ................... | 370/208 |
| 7,058,151 B1 * | 6/2006 | Kim ............................. | 375/355 |
| 2004/0179625 A1 * | 9/2004 | Kim ............................. | 375/260 |
| 2006/0239370 A1 * | 10/2006 | Mody et al. ................... | 375/260 |

* cited by examiner

*Primary Examiner* — Ted Wang

(57) ABSTRACT

The present invention provides a method for coarse frequency synchronization in an OFDM receiver. Even if the maximum variation of crystal oscillator (X-TAL) frequency disturbance is maximized and most of the variation in crystal oscillator (X-TAL) frequency disturbance is vary small, the estimation or search method of the present invention is capable of rapidly and effectively terminating the estimation of the integral multiple frequency offset (IFO). The integral multiple frequency offset (IFO) candidate is ascendingly increased and descendingly reduced at one value interval. In the estimation IFO, the correlation peak value in the intermediate status is compared to the thresholds, the coarse frequency synchronization (CFS) acquisition directly is ended and ensured when the correlation peak value is greater than the threshold, and a confidence check is not performed when correlation peak value is less than the threshold for considerably reducing the acquisition time of the CFS.

4 Claims, 5 Drawing Sheets

METHOD FOR COARSE FREQUENCY SYNCHRONIZATION IN OFDM RECEIVER

FIELD OF THE INVENTION

The present invention relates to a receiver of an orthogonal frequency division multiplexing (OFDM) receiver, and more particularly to a method for coarse frequency synchronization in an OFDM receiver by employing the candidate sequences and thresholds of the integer frequency offset.

BACKGROUND OF THE INVENTION

With respect to the OFDM transmission protocol, a reference signal is transmitted for synchronizing the time domain or frequency domain. For example, the phase reference symbol of terrestrial digital multimedia broadcasting (T-DMB) or the discrete, and continuous pilot frequency patterns of digital video broadcasting—terrestrial and handheld, DVB-T/H) and integrated services digital broadcast—terrestrial (ISDB-T) are employed.

Regarding to a frequency synchronization model, an integral multiple frequency offset (IFO) of the sub-carrier space is estimated to perform the method of coarse frequency synchronization (CFS).

FIG. 1 is schematic block diagram of a conventional coarse frequency synchronization (CFS) mechanism. FIG. 2 is schematic view of conventional steps for estimating unit IFO. FIG. 3 is schematic view of performing a conventional coarse frequency synchronization (CFS) method.

Please refer to FIGS. 1-3. Based on conventional techniques, the correlations corresponding to the IFO candidates (D) are calculated while performing CFS mechanism by using one of phase reference symbol correlated method and channel impulse response method wherein the IFO candidates (D) are estimated as IFO when peak value appears, which is termed as the estimation of unit IFO shown in FIG. 2.

Furthermore, if the estimation of unit IFO is tried once, it will cause the incorrect situation. Thus, in order to reduce the incorrect situation, a continuity check or majority vote method is employed to detect the reliability of the estimation of unit IFO for confirming the estimated IFO candidates (D), which is termed as the CFS method shown in FIG. 3.

The duration of performing the above-mentioned CFS method is determined by the product of unit IFO estimation time and the number of times for reliability check. In other words, according to the maximum variation of crystal oscillator (X-TAL) frequency disturbance in the induced IFO, the search or estimation range of the IFO candidates (D) is configured and the maximum peak is found after retrieving all the search or estimation range. Then, the estimation time is multiplied by the number of times during the reliability check to generate the consumption time.

However, even if the maximum variation of crystal oscillator (X-TAL) frequency disturbance is maximized, most of the variation in the crystal oscillator (X-TAL) frequency disturbance is vary small and most of estimated IFO candidates (D) are statistically gathered near the zero value. Further, when the transmission signal is very weak and the reliability check is still performed, it takes more consumption time during the reliability check.

SUMMARY OF THE INVENTION

The first objective of the present invention is to provide a method for coarse frequency synchronization in an OFDM receiver. Even if the maximum variation of crystal oscillator (X-TAL) frequency disturbance is maximized and most of the variation in the crystal oscillator (X-TAL) frequency disturbance is vary small, the estimation or search method of the present invention is capable of rapidly and effectively terminating the estimation of the integral multiple frequency offset (IFO). The integral multiple frequency offset (IFO) candidate is ascendingly increased and descendingly reduced at one value interval. In the estimation IFO, the correlation peak value in the intermediate status is compared to the thresholds, the CFS acquisition directly is ended and ensured when the correlation peak value is greater than the threshold, and a confidence check is not performed when the correlation peak value is less than the threshold for considerably reducing the acquisition time of the CFS.

According to the above objective, the present invention sets forth a method for coarse frequency synchronization in an OFDM receiver. The method includes the steps of: configuring an initial value of an integral multiple frequency offset (IFO) candidate as a zero value and alternately increasing and reducing the integral multiple frequency offset (IFO) candidate at one value interval; terminating an estimation of an unit IFO when a correlation peak value corresponding to the integral multiple frequency offset (IFO) candidate is greater than a first threshold; neglecting a confidence check not to perform the confidence check since the estimation of an unit IFO is reliable when the correlation peak value is greater than a second threshold after terminating the estimation of the unit IFO, and ending an acquisition of a coarse frequency synchronization (CFS); and defining the integral multiple frequency offset (IFO) candidate as a non-receiving status when the correlation peak value is less than a third threshold after terminating the estimation of the unit IFO, and ending an acquisition of a coarse frequency synchronization (CFS).

In one embodiment, the first threshold is defined as a value which performs the confidence check and do not check a plurality of integral multiple frequency offset (IFO) candidates during the estimation of the unit IFO.

In one embodiment, the second threshold is defined as a value which do not perform the confidence check and do not check a plurality of integral multiple frequency offset (IFO) candidates during the estimation of the unit IFO.

In one embodiment, the third threshold is defined as a value which does not perform the confidence check to rapidly be determined as no channel available when the correlation peak value is less than the third threshold after checking a plurality of integral multiple frequency offset (IFO) candidates during the estimation of the unit IFO.

In the present invention, the integral multiple frequency offset (IFO) candidate is ascendingly increased and descendingly reduced at one value interval. In the estimation IFO, the correlation peak value in the intermediate status is compared to the thresholds, the CFS acquisition directly is ended and ensured when the correlation peak value is greater than the threshold, and a confidence check is not performed when the correlation peak value is less than the threshold for considerably reducing the acquisition time of the CFS.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
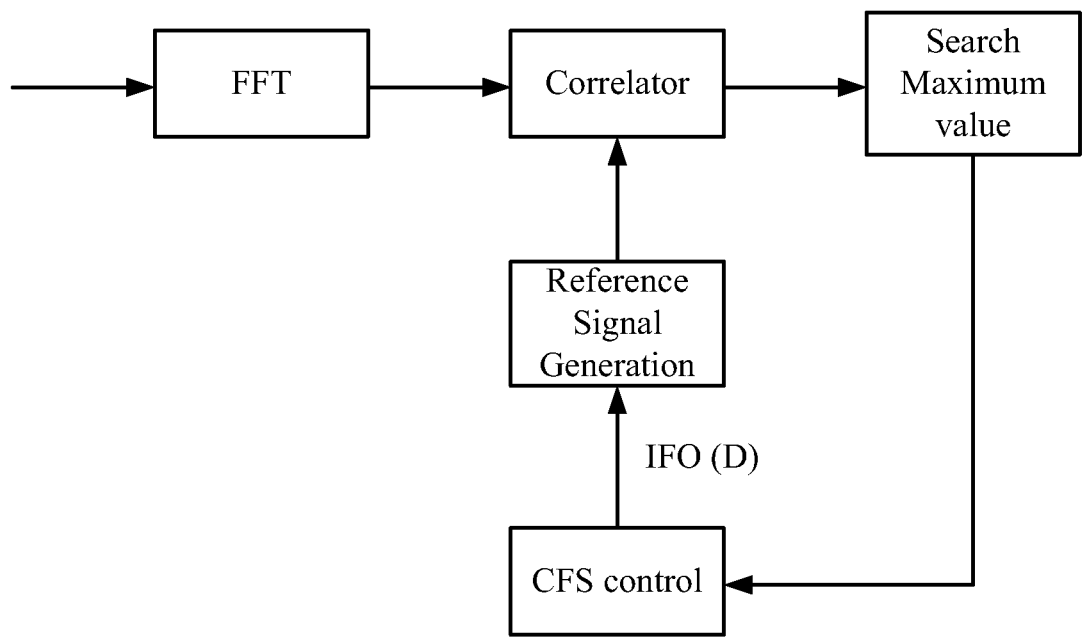
FIG. 1 is schematic block diagram of a conventional coarse frequency synchronization (CFS) mechanism.
Figure 2:
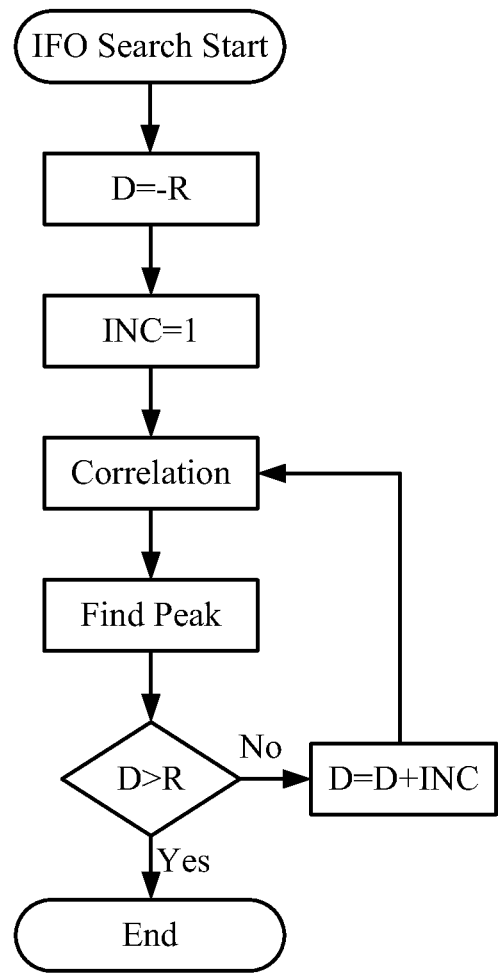
FIG. 2 is schematic view of the conventional steps for estimating the unit integral multiple frequency offset (IFO)
Figure 3:
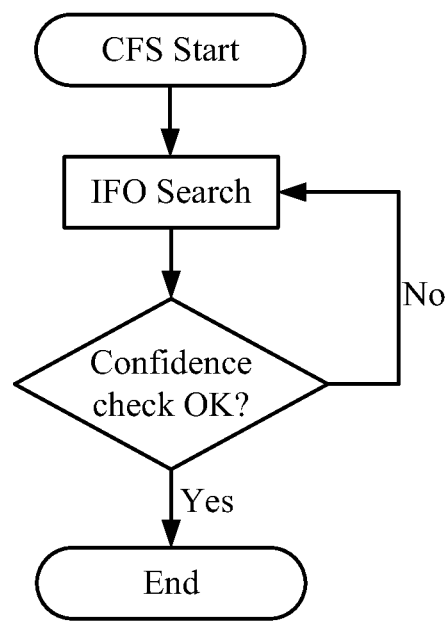
FIG. 3 is schematic view of performing a conventional coarse frequency synchronization (CFS) method.
Figure 4:
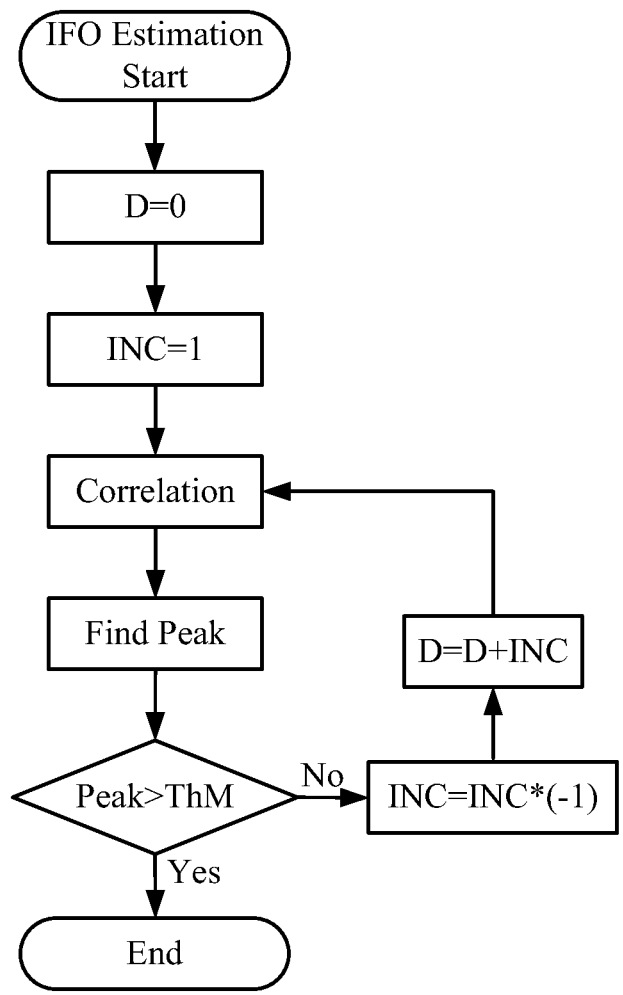
FIG. 4 is schematic view of the steps for estimating the unit integral multiple frequency offset (IFO) according to one embodiment of the present invention.

FIG. 4 is schematic view of the steps for estimating and/or searching the unit integral multiple frequency offset (IFO) according to one embodiment of the present invention. In FIG. 4, a step of an IFO estimation and/or search starts. Afterward, in the step of candidate D=0, an initial value of an integral multiple frequency offset (IFO) candidate is configured as a zero value. In the step of candidate INC=1, the integral multiple frequency offset (IFO) candidate is alternately increased and reduces at one value interval wherein the increment interval is one in this case. In the step of calculating a correlation, a correlation corresponding to the integral multiple frequency offset (IFO) candidate (D) is found. The correlation peak value corresponding to the integral multiple frequency offset (IFO) candidate which is greater than a first threshold is estimated.

In the step of determining whether the peak value is greater than threshold (ThM), an estimation of a unit IFO is terminated when a correlation peak value corresponding to the integral multiple frequency offset (IFO) candidate is greater than the first threshold (ThM). In this case, the first threshold (ThM) is defined as a value which performs the confidence check and do not check a plurality of integral multiple frequency offset (IFO) candidates during the estimation of the unit IFO.

In another case of determining whether the peak value is greater than first threshold (ThM), if the peak value is not greater than first threshold (ThM), the minus one is used to the increment (such as the equation of INC=INC*(−1)) to decrease the integral multiple frequency offset (IFO) candidate to generate the IFO D (such as the equation of D=D+INC). Then, return the correlation step to find the correlation corresponding to the integral multiple frequency offset (IFO) candidates and repeat the above steps. In other words, the maximum peak value is searched by finding the correlation. In this case, the IFO D are alternatively employed by either plus one (+1) or minus one (−1).

By employing the above-mentioned manner, even if the maximum variation of crystal oscillator (X-TAL) frequency disturbance is maximized and most of the variation in the crystal oscillator (X-TAL) frequency disturbance is vary small and most of estimated IFO candidates (D) are statistically gathered near the zero value, the estimation or search method of the present invention is capable of rapidly and effectively terminating the IFO estimation.

Figure 5:
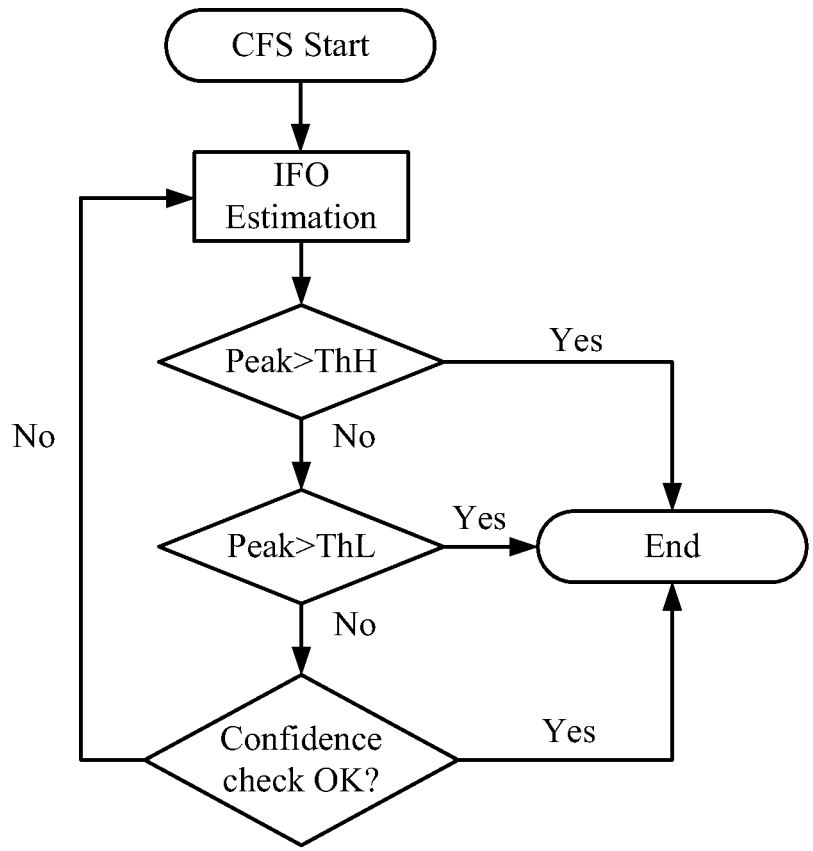
FIG. 5 is schematic view of performing a coarse frequency synchronization (CFS) method according to one embodiment of the present invention.

FIG. 5 is schematic view of performing a coarse frequency synchronization (CFS) method according to one embodiment of the present invention. In FIG. 5, a CFS step is performed. Afterward, the estimation of unit IFO starts. After the step of estimation of unit IFO ends, the peak value calculated by IFO estimation is used to determine whether the correlation peak value is greater than a second threshold (ThH). If the correlation peak value is greater than a second threshold (ThH), the estimation of unit IFO is reliable, and thus there is no need to perform a confidence check and an acquisition of a coarse frequency synchronization (CFS) is ended. The second threshold (ThH) is defined as a value which do not perform the confidence check and do not check a plurality of integral multiple frequency offset (IFO) candidates during the estimation of the unit IFO.

In another case, after the IFO candidates are checked and if the correlation peak value (which is less than the second threshold (ThH) is less than the third threshold (ThL), it is determined whether the confidence check is correct. If it is correct, the confidence check is not performed to rapidly be determined as no channel available when the correlation peak value is less than the third threshold after checking a plurality of integral multiple frequency offset (IFO) candidates during the estimation of the unit IFO. Then, an acquisition of a coarse frequency synchronization (CFS) is ended. If the confidence check is not correct, repeatedly perform the step of estimation of unit IFO.

When the receiving signal is very weak, the main controller of the receiver acquires the information from the coarse frequency synchronization (CFS) mechanism and effectively repeatedly performs the synchronization step or defines the integral multiple frequency offset (IFO) candidate as a non-receiving status. Specifically, after the peak value is checked by the second threshold (ThH) and the third threshold (ThL) and the reliability of confidence check is correct, the estimations of unit IFO are repeatedly performed and then proceed to end. In other words, if the peak value is less than the second threshold (ThH) and greater than the third threshold (ThL), a confidence check is performed to reduce the incorrect estimation. The third threshold (ThL) is defined as a value which does not perform the confidence check to rapidly be determined as no channel available when the correlation peak value is less than the third threshold after checking a plurality of integral multiple frequency offset (IFO) candidates during the estimation of the unit IFO.

According to the above-mentioned steps, there is no need a step of confidence check when the receiving signal is robust and the repeat number of times of the confidence check can thus be effectively reduced to rapidly complete the CFS when the receiving signal is very weak.

Moreover, when the receiving signal is in the intermediate status between the weak and robust statuses, a confidence check is employed to advantageously reduce the incorrect estimation.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A method for coarse frequency synchronization in an orthogonal frequency division multiplexing (OFDM) receiver of an electronic apparatus, the method comprising the steps of:
   configuring an initial value of an integral multiple frequency offset (IFO) candidate signal as a zero value and alternately increasing and reducing the integral multiple frequency offset (IFO) candidate signal at one value interval;
   terminating an estimation signal of an unit IFO when a correlation peak value corresponding to the integral multiple frequency offset (IFO) candidate signal is greater than a first threshold;

neglecting a confidence check not to perform the confidence check since the estimation signal of an unit IFO is reliable when the correlation peak value is greater than a second threshold after terminating the estimation signal of the unit IFO, and ending an acquisition of a coarse frequency synchronization (CFS); and defining the integral multiple frequency offset (IFO) candidate signal as a non-receiving status when the correlation peak value is less than a third threshold after terminating the estimation signals of the unit IFO, and ending an acquisition of a coarse frequency synchronization (CFS).

2. The method for coarse frequency synchronization in an OFDM receiver of claim 1, wherein the first threshold is defined as a value which performs the confidence check and do not check a plurality of integral multiple frequency offset (IFO) candidate signals during the estimation signal of the unit IFO.

3. The method for coarse frequency synchronization in an OFDM receiver of claim 1, wherein the second threshold is defined as a value which do not perform the confidence check and do not check a plurality of integral multiple frequency offset (IFO) candidate signals during the estimation signal of the unit IFO.

4. The method for coarse frequency synchronization in an OFDM receiver of claim 1, wherein the third threshold is defined as a value which do not perform the confidence check to rapidly be determined as no channel available when the correlation peak value is less than the third threshold after checking a plurality of integral multiple frequency offset (IFO) candidate signals during the estimation signal of the unit IFO.

* * * * *